United States Patent [19]
Berry

[11] Patent Number: 5,833,526
[45] Date of Patent: Nov. 10, 1998

[54] BULLHEAD CATFISH SKINNER

[76] Inventor: William Berry, 275 Chipman Corners Rd., Groton, N.Y. 13073

[21] Appl. No.: 896,900

[22] Filed: Jul. 18, 1997

[51] Int. Cl.$^6$ .................................................. A22C 25/17
[52] U.S. Cl. .............................. 452/132; 452/6; 452/17; 452/125
[58] Field of Search .................................. 452/136, 121, 452/6, 17, 125

[56] References Cited

U.S. PATENT DOCUMENTS

| | | |
|---|---|---|
| D. 247,443 | 3/1978 | Catterfeld . |
| D. 355,699 | 2/1995 | Eggler . |
| 2,244,270 | 6/1941 | Verrett . |
| 2,946,084 | 7/1960 | Boutillette . |
| 3,088,165 | 5/1963 | Bellis . |
| 3,333,295 | 9/1965 | Spets . |
| 4,069,551 | 1/1978 | Van Dyke et al. . |
| 4,172,306 | 10/1979 | Hopkins ........................................ 452/6 |
| 4,200,961 | 5/1980 | Mueller ........................................ 452/6 |
| 4,524,490 | 6/1985 | Newville ...................................... 452/6 |
| 4,569,103 | 2/1986 | Taurinskas ................................... 452/6 |
| 4,967,446 | 11/1990 | Padel ............................................ 452/6 |
| 5,080,629 | 1/1992 | Ellison ........................................ 452/6 |

*Primary Examiner*—Willis Little
*Attorney, Agent, or Firm*—Brown, Pinnisi & Michaels, PC

[57] ABSTRACT

This invention relates to the development of a new and useful improvement in fish dressing tools, which has as its prime objective a means whereby a fish may be quickly and efficiently dressed, having its skin and entrails removed. The device has two rounded tines, the sharpened ends of which are usefully engaged with the spine of the catfish that is to be cleaned after the body of said fish has been cut by a bladed instrument. Thereafter, force is applied to the skinning device in a pulling manner, typically in a direction corresponding to the long axis of said fish, and away from the cuts made so as facilitate the snapping of the spinal column and thereafter the cleaning of the fish, the skinner device firmly engaging the spinal column of the body of the fish during said pulling movement.

5 Claims, 1 Drawing Sheet

BULLHEAD CATFISH SKINNER

FIELD OF THE INVENTION

The invention pertains to the field of fish dressing tools. More particularly, the invention pertains to the development of a catfish-skinning device.

BACKGROUND OF THE INVENTION

In order to consume a catfish after it is caught, it is generally desirable to clean the fish by removing its skin and internal organs. In this process of dressing a fish, and specifically with regard to the bullhead catfish, it is known that removal of said skin and internal organs can be both difficult and time-consuming. For that reason a number of individuals have attempted to develop devices which facilitate not only the skinning of a fish but also the methods of contemporaneously removing a hook, entrails, head, tail, and fins regardless of the size of the fish. In this effort to create an "all-in-one" tool, the simplicity of use, and design have been lost. Moreover, in attempting to provide a single tool suitable for all fish, regardless of their size, and capable of the multiple tasks deemed necessary before a fish can be consumed, the efficiency of the process has been compromised. Due to this, none of the prior art delivers a tool that is precisely designed or optimized for just one task, the removal of skin and entrails from the edible portion of the bullhead catfish, or similarly sized fish. For this reason the present inventor developed a novel device which is designed to allow the removal of skin and entrails of a fish to be both quick and efficient.

Examples of the prior art include U.S. Pat. No. 2,244,270, which was given to Verrett, and included a design for a fishhook extractor, not a fish-skinning tool. The Verrett design employs two straight prongs or tines ending in a "V" shaped notch created to hold the fishing line in one place during hook removal. However, the device cannot be employed for skinning a catfish since the tines are blunt and otherwise incapable of engaging and holding the skin or body of the fish to be skinned.

U.S. Pat. No. 2,946,084, given to Boutillette, differs from the immediate invention in that it has a knife-like portion for cutting the skin coupled with a bent-over or punched-out, detachable "hooklike portion" for pulling off the skin. This device is incapable of being inserted under the skin and into the spinal column of the fish to be skinned, and thus is in no way similar to the intended use of the instant invention.

U.S. Pat. No. 3,088,165, given to Bellis, is one of many catfish dressing tools that employ a variation of pliers in order to effectively remove the skin from the fish. This is not a principle that the present invention relies upon or employs in any way.

U.S. Pat. No. 3,333,295, given to Spets, does employ two tines for skinning a fish. However the two tines actually vary in both relative size from one another and in use. One tine of the Spets device is sharp prong while the other is a substantially flat blade whose end is rounded. The smaller tine can inserted under the skin while the whole is rotated allowing the skin to be lifted up and "rolled" off. The design of the tool and the way it functions is dissimilar to the application of the instant invention.

U.S. Pat. No. 4,069,551, given to Van Dyke, also relies upon the use of a pliers-type tool to remove the skin from a catfish.

U.S. Design Pat. No. 355,699, given to Eggler is one of a species of mini fish hook removers, and cannot be used to skin a catfish in any fashion.

U.S. Design Pat. No. 247,443, given to Catterfeld, is proclaimed to be a "FISH CLEANING TOOL" but it is uncertain how it can be used for this purpose since it has apparently rounded and blunt ends, and is thus neither able to grip the flesh of the fish to be skinned nor being capable of being inserted underneath the skin of the fish.

SUMMARY OF THE INVENTION

The current invention relates to the development of a fish skinning or dressing tool which has as its objectives ease and adaptability of use, ease of storage, ease of cleaning, and simplicity of design. The device is substantially in the form of an elongated member, with or without a rounded handle, that at one end thereof has two rounded tines of equal size ending in a sharp point. In the removal of the skin and entrails of the subject fish, the user first makes two cuts in the skin of the fish to be skinned. One cut is slightly behind the dorsal fin of the subject fish, perpendicular to the length of the dorsal fin, while the second is also behind the dorsal fin along the dorsal spinal column and so perpendicular to the first cut. Thereafter, the user inserts the skinner device through the opening in the cut skin such that the tines are engaged in the body of the fish, one tine on either side of the spinal column. Once this is accomplished the user holds the head of the subject fist firmly and with an upward movement of the skinner device, perpendicular to the head of the subject fish, snaps the spinal column of the subject fish and in one motion removes the head, skin and entrails.

DESCRIPTION OF THE PREFERRED EMBODIMENT

Figure 1:
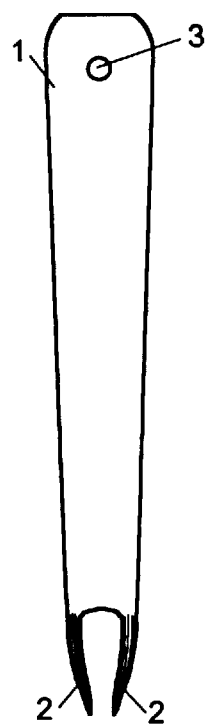
FIG. 1 shows a top view of the invention demonstrating its elongated character and its tines.
Figure 2:
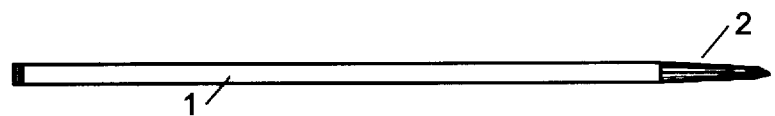
FIG. 2 shows a side view of the invention demonstrating its slimness.

FIG. 1 shows a top view of the invention. The catfish skinner herein disclosed is made up of an elongated body (1), having a pair of rounded tines (2) on one end. The handle may have a hole (3) for ease of storage or hanging. The tool is preferably at least 4 inches long, while the length of the tines is preferably greater than 0.25 inch. These dimensions are necessary to ensure that the device is of suitable size to skin catfish, firmly engage the spinal column of the subject fish to be skinned, and can be handled easily. The slim nature of the invention is demonstrated by the side view presented in FIG. 2. This view serves to underscore the small storage space needed by such a device.

Figure 3:
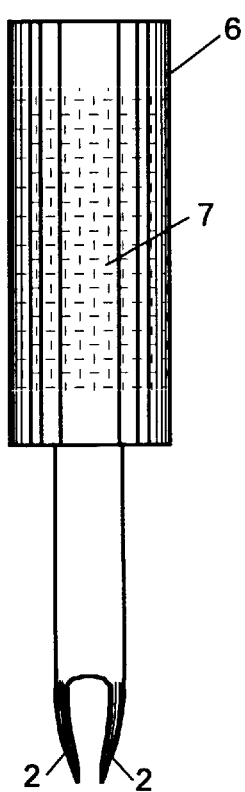
FIG. 3. In an alternate embodiment the skinner device is depicted with a rounded handle at the end of the device opposite the tines.

Another embodiment of the device, (FIG. 3), would be to construct the device such that the end opposite the tines is an enlarged and rounded handle (6), allowing a greater ease of use. This embodiment would include having the enlarged portion of the handle grooved or roughened (7) such that it aids the user in maintaining control of the skinner device during the skinning process. Particularly in wet environments, after multiple fish have been caught and are being cleaned for consumption this feature would insure that the skin is removed quickly and efficiently, aiding the user to maintain his grip.

The Operation of the device is as follows:

Example 1

In the removal of the skin and entrails of the subject fish, the user first makes two cuts in the skin of the fish to be skinned. The first cut being slightly behind the dorsal fin of the subject fish, perpendicular to the length of the dorsal fin, and the second cut behind the dorsal fin running along the dorsal spinal column to the beginning of the tail fin. Referring to FIG. 1, the user then inserts the skinner device through the opening in the cut skin such that the tines (2) are engaged in the body of the fish, one tine on either side of the spinal column. Once this is accomplished the user holds the head of the subject fish firmly and with an upward pulling movement of the skinner device (1), perpendicular to the firmly held head of the subject fish, snaps the spinal column of the subject fish and in a continuing motion removes the head, skin and entrails.

Example 2

Referring to FIG. 1, after a bladed instrument has been used to cut the skin of the catfish at selected locations, and/or after the head of a catfish has been removed, the tines (2) of the device (1) are inserted into a portion of said skin of the fish, thereby engaging it. Once the skin of said fish is engaged, a pulling action on the device (1) will cause the skin to be drawn from the body of the fish in a direction corresponding with the direction of the pulling force on the tines (2). Typically this force is exerted down the longitudinal axis of the fish being skinned.

Accordingly, it is to be understood that the embodiments of the invention herein described are merely illustrative of the application of the principles of the invention. While the invention has been illustrated particularly for use in removing the skin form a catfish, it is to be understood that it may be adapted to any other similar uses or methods of fish skin removal, all of which are within the scope of the invention.

What is claimed is:

1. A method of using a fish skinning tool which consists of substantially a flat elongated body having a first end and a second end with a length therebetween, the first end of the elongated body having two rounded and pointed tines of equal size, comprising the steps of:

a) making a cut in the skin of the fish to be cleaned behind and perpendicular to the length of the dorsal fin of the fish;

b) making another cut in the skin of the fish to be cleaned, behind the dorsal fin and continuing along the dorsal spinal column of said fish to the beginning of the tail fin of said fish;

c) inserting the skinner device through the opening in said cut skin such that the tines of said fish skinning tool are firmly engaged in the body of the fish, one tine on either side of the spinal column;

d) holding the head of the fish to be cleaned contemporaneously with an upward movement of said fish skinning tool, perpendicular to the head of said subject fish, snapping the spinal column of said subject fish; and e) continuing said motion so as to separate the head, skin and entrails of said fish to be cleaned from the edible portion of said subject fish to be cleaned.

2. A fish skinning tool comprising:

a) a substantially flat elongated body having a first end and a second end with a length therebetween, said elongated body being rounded along a length of said elongated body such that a handle is formed;

b) a pair of rounded and pointed parallel tines of equal size, extending from said first end of said body, said pair of tines having opposed facing edges separated by a distance sufficient to allow the placement of said pair of tines on either side of the spinal column of a fish to be skinned;

wherein said handle is contoured so as to enhance the grip of a user of the device.

3. The fish skinning tool of claim 2, wherein said pair of tines extend at least 0.25 inch from said first end of said body.

4. The fish skinning tool of claim 2, wherein the overall length of said fish skinning tool is at least 4 inches.

5. The fish skinning tool of claim 2, wherein said opposed facing edges are separated by a distance of at least 0.125 inch.

* * * * *